United States Patent
Luechinger et al.

(10) Patent No.: US 8,141,751 B2
(45) Date of Patent: Mar. 27, 2012

(54) DOSAGE-DISPENSING DEVICE FOR SUBSTANCES IN POWDER- OR PASTE FORM

(75) Inventors: Paul Luechinger, Uster (CH); Siegfried Zeiss, Wolfhausen (CH); Sandra Ehrbar, Gutenswil (CH)

(73) Assignee: Mettler-Toledo AG, Greifensee (CH)

( * ) Notice: Subject to any disclaimer, the term of this patent is extended or adjusted under 35 U.S.C. 154(b) by 950 days.

(21) Appl. No.: 11/817,822

(22) PCT Filed: Oct. 3, 2006

(86) PCT No.: PCT/EP2006/067012
§ 371 (c)(1),
(2), (4) Date: Jun. 3, 2008

(87) PCT Pub. No.: WO2007/039614
PCT Pub. Date: Apr. 12, 2007

(65) Prior Publication Data
US 2008/0283555 A1 Nov. 20, 2008

(30) Foreign Application Priority Data
Oct. 3, 2005 (EP) .................................. 05109151

(51) Int. Cl.
*G01F 11/00* (2006.01)
*G01F 13/00* (2006.01)
(52) U.S. Cl. ........ 222/235; 222/217; 222/229; 222/240; 222/510
(58) Field of Classification Search .................. 222/235, 222/510, 240, 265, 361, 284, 365, 217
See application file for complete search history.

(56) References Cited

U.S. PATENT DOCUMENTS
1,149,522 A * 8/1915 Iden et al. ..................... 222/361
(Continued)

FOREIGN PATENT DOCUMENTS
DE 198 41 478 A1 3/1999
(Continued)

OTHER PUBLICATIONS
Form PCT/ISA/210 (International Search Report) dated Feb. 6, 2007.
(Continued)

*Primary Examiner* — Kevin P Shaver
*Assistant Examiner* — Melvin Cartagena
(74) *Attorney, Agent, or Firm* — Buchanan Ingersoll & Rooney PC

(57) ABSTRACT

A dosage-dispensing device, for substances in powder- or paste form, includes a supply container and a dosage-dispensing head that is connected or connectable to the supply container. A housing has an outlet orifice of circular cross-section and a delivery- and closure element with a closure portion serving to close off the outlet orifice. The device further has a conveying tool with at least one conveying element that serves to direct the substance to the outlet orifice, wherein the outlet orifice and the delivery- and closure element are arranged on the central lengthwise axis of the dosage-dispensing head. The conveying tool is rotatable about the central lengthwise axis in relation to the housing and the at least one conveying element is designed to move on a circular path about the central lengthwise axis. The delivery- and closure element includes a delivery portion which serves to deliver a substance that is to be dispensed, and the delivery- and closure element is configured to be rotatable about the central lengthwise axis in relation to the housing and to be capable of translatory displacement along the central lengthwise axis relative to the outlet orifice. The at least one conveying element of the conveying tool which serves for the delivery of substance is slanted in the direction of its rotation at an acute angle to the plane of its circular path.

21 Claims, 8 Drawing Sheets

U.S. PATENT DOCUMENTS

| | | | |
|---|---|---|---|
| 1,337,789 A * | 4/1920 | Eldridge | 222/246 |
| 2,084,029 A | 6/1937 | Hochstim | |
| 2,102,994 A * | 12/1937 | Claudel | 222/229 |
| 4,341,329 A | 7/1982 | Kuemmerer et al. | |
| 4,905,525 A | 3/1990 | Kurfürst | |
| 5,145,009 A | 9/1992 | Mheidle et al. | |
| 7,284,574 B2 | 10/2007 | Fontaine et al. | |

FOREIGN PATENT DOCUMENTS

| | | |
|---|---|---|
| EP | 0 201 777 A2 | 11/1986 |
| EP | 0 654 422 A1 | 5/1995 |
| FR | 2 607 794 A1 | 6/1988 |
| FR | 2 682 083 A1 | 4/1993 |
| GB | 701572 | 12/1953 |
| GB | 1 601 568 | 10/1981 |
| JP | 53-011729 B | 4/1978 |
| JP | 55-158518 A | 12/1980 |
| JP | 60-052724 A | 3/1985 |
| JP | 60-173765 A | 9/1985 |
| JP | 62-081769 A | 4/1987 |
| JP | 06-019091 B | 3/1994 |
| JP | 07-041083 B | 5/1995 |
| JP | 2000-211747 A | 8/2000 |
| JP | 2002-529130 A | 9/2002 |
| JP | 2004-018073 A | 1/2004 |
| WO | WO 00/27262 A1 | 5/2000 |
| WO | WO 2004/042334 A1 | 5/2004 |

OTHER PUBLICATIONS

European Search Report of EP 05 10 9150 dated Mar. 9, 2006 (with English translation of category of cited documents).

European Search Report of EP 05 10 9151 dated Mar. 9, 2006 (with English translation of category of cited documents).

* cited by examiner

DOSAGE-DISPENSING DEVICE FOR SUBSTANCES IN POWDER-OR PASTE FORM

The invention relates to a dosage-dispensing device for substances in powder- or paste form which has a dosage-dispensing head that can be or is connected to a source- or supply container.

Dosage-dispensing devices of this kind find application particularly for the dispensing of small quantities of, e.g., toxic substances into small target containers with a high degree of precision. Such target containers are frequently set on a balance in order to weigh the quantity of substance delivered out of the dosage-dispensing device, so that the substance can subsequently be further processed as directed.

The substance to be dispensed in doses is held for example in a supply container which has a connection to the dosage-dispensing head. To perform the dosage-dispensing process, the supply container and the dosage-dispensing head together form a unit, the dosage dispensing-device. The opening of the dosage-dispensing device through which the substance to be dispensed is delivered should preferably be small to allow the targeted delivery of the substance into a container with a narrow opening.

Dosage-dispensing devices for dry and/or powdery pourable materials, for example color dye powders, are known from the prior art and are in operation. As an example, a dosage-dispensing device is described in U.S. Pat. No. 5,145,009 A, consisting of a delivery container with a closable outlet at its underside. As a closure device, a conical valve body is used which has a narrowing taper towards the top and is movable vertically downward to open an outlet orifice. In its open position, the valve body rotates, and is equipped with means to advance the material in the direction of the outlet orifice.

The device of the foregoing description is less suitable for the dispensing of pourable material into containers that have openings with a narrow cross-section. The structure of the valve body with the upward-narrowing taper as well as the rotation of the valve body will cause the particles of the pourable material to leave the outlet with a radial, i.e. horizontal velocity component and will therefore cause a scattering of the particles which can reach even beyond a relatively large opening cross-section of a receiving container.

A method and a device for the delivery of a very small sample quantity of a powder or paste, for example for applications in atomic absorption spectroscopy, are disclosed in U.S. Pat. No. 4,905,525 A. In a supply container with an outlet orifice at the end of a form channel, a piston reaches from above into the sample material in the container. A small sample quantity is pushed through the form channel and delivered from the outlet orifice by pressing the piston into the sample material so that the sample material is compacted above the form channel. In a special embodiment the container is configured in the shape of a funnel towards the outlet orifice and the piston is arranged in an oblique position relative to the outlet orifice.

A dosage-dispensing device for viscous, pasty, powdery or granular products is described in DE 198 41 478 Al, with a supply container of a shape which has a narrowing taper towards the bottom end (in the operating position of the dosage-dispensing device) where the container has an outlet orifice. Wiper tools are attached to a centrally arranged and rotatable hollow shaft. The dosage-dispensing device has a dosage valve with a valve stem that is arranged inside the hollow shaft, is capable of translatory up- and down-movement, and has at its bottom end a conical valve head with an upward-narrowing taper, so that the outgoing quantity of the dispensed material can be regulated and the outlet orifice can be closed off from above. In some of the embodiments described the dosage valve is likewise designed to be rotatable.

A dosage-dispensing device according to DE 198 41 478 A1 or according to U.S. Pat. No. 5,145,009 A is limited in how small the quantity to be delivered out of the container can be. As the outlet orifice is ring-shaped, the minimum width of the ring gap that can be used for dispensing cannot be narrower than the dimension of the smallest unit of a pourable material, for example a grain of powder, and consequently several units of the pourable material can exit simultaneously through the ring gap. There is further a risk that, depending on the consistency of the pourable material, a part of the gap can be clogged up. This can happen in particular if the delivery rate is to be slowed down towards the end of the dosage-dispensing process by reducing the width of the ring gap, because this will lead to a progressively less favorable ratio between the width and circumference length of the ring gap.

The object of the invention is to propose a dosage-dispensing device that allows the smallest substance quantities of powders or pastes to be filled in a controlled manner into a container. A further object of the invention is to provide the capability to deliver strongly coagulating substances or pastes with the dosage-dispensing device.

This task is solved through the features of the independent claim 1.

A dosage-dispensing device for substances in powder- or paste form is equipped with a supply container and, connected or connectable to the latter, a dosage-dispensing head comprising a housing with an outlet orifice of circular cross-section. The dosage-dispensing head further comprising a delivery- and closure element with a closure portion that serves to close off the outlet orifice. A conveying tool is included with at least one conveying element which serves to direct the substance to the outlet orifice. The outlet orifice and the delivery- and closure element are arranged on the central lengthwise axis of the dosage-dispensing head. The conveying tool is designed to be rotatable relative to the housing about the central lengthwise axis, and thus the at least one conveying element is configured to be movable on a circular path about the central lengthwise axis. The delivery- and closure element includes a delivery portion that serves to discharge substance to be dispensed. The delivery- and closure element is designed to be rotatable about the central lengthwise axis in relation to the housing and to be capable of translatory displacement along the central lengthwise axis in relation to the outlet orifice so that, accordingly, it can be moved out of the outlet orifice as well as into the outlet orifice. To perform its function of discharging substance, the at least one conveying element of the conveying tool is inclined in the direction of its rotation at an acute angle relative to the plane of its circular path.

Through a translatory displacement of the delivery- and closure element along the central lengthwise axis of the dosage-dispensing device, an effective outlet orifice which is constituted by the part of the outlet orifice through which the substance to be dispensed leaves the dosage-dispensing device when the latter is in operation, in other words at least one passage opening, can be made larger or smaller in a defined, continuous manner. A variable passage opening allows larger or smaller substance quantities to be delivered as needed. In particular, it is possible to dispense substance quantities of the smallest order, for example powder in the microgram range. In a dosage-dispensing process, a large substance quantity can thus be delivered in a first phase with a relatively large passage opening, and as a given target quantity is being approached, the passage opening can be reduced by the translatory movement of the delivery- and closure element in such a way that only a very small flow of substance is delivered and the target quantity can therefore be met with the utmost accuracy. In addition, the substance to be delivered is directed to the outlet orifice by means of the conveying tool which through its shape and arrangement imparts a downward-directed force component to the substance and thus, in a sense, pushes the substance out of the passage opening. Also at the same time, the conveying tool effects a loosening of the substance, in particular if the latter is a powder.

Due to the fact that the conveying tool is supported and guided along the central lengthwise axis with translatory mobility relative to the delivery- and closure element, the conveying tool always remains in loose contact with the edge of the housing that surrounds the outlet orifice (subsequently referred to as the rim of the outlet orifice) during operation of the dosage-dispensing device. This ensures that even when the passage opening is reduced to its smallest size, there is always a sufficient amount of substance being directed to the passage opening. Consequently, with the conveying tool and the delivery- and closure element working together, it is possible to dispense measured doses of strongly coagulating powders or of powders with electrostatically charged particles or doses of pastes as these substances are loosened, directed to the passage opening in a controlled manner, and wiped off the rim of the outlet orifice.

The sense of rotation of the delivery- and closure element as well as of the conveying tool is determined by the arrangement and configuration of the conveying tool working together with the delivery portion and/or of the delivery portion itself.

In a preferred embodiment of the conveying tool, the at least one conveying element includes an extensive smooth surface area which preferably has a curvature in one or in two directions, comparable to a shovel.

According to a further aspect of the invention, the conveying tool has at least one conveying element, whose extensive smooth area is oriented at an acute angle relative to the radius of its circular path and tangentially touches the rim of the outlet orifice. Alternatively or simultaneously, the conveying element can be slanted at an acute angle relative to the central lengthwise axis. These measures, especially when used in combination with each other, provide a high measure of improvement in the delivery of sticky powders or pasty substances.

In a preferred configuration, the conveying tool has at least one conveying element with a tip which in the operating state of the dosage-dispensing device remains always in loose contact with the rim of the outlet orifice. In particular, this tip can in addition be slightly curved towards the central lengthwise axis. The border of the conveying element that faces towards the outlet orifice can also have a sharp edge, which in the dispensing of strongly coagulating substances prevents the latter from sticking to the outlet orifice or to the delivery portion.

In a further advantageous embodiment, the conveying tool can be pushed against the rim of the outlet orifice by means of a spring force and is in a special configuration equipped with a spring arm as a conveying element.

The delivery- and closure element can be configured in many different ways. The delivery- and closure element in its basic configuration is of a cylindrical shape and has a cylindrical closure portion that serves to close off the outlet orifice, and it further has, adjacent to the closure portion, a delivery portion that serves to deliver the substance to be dispensed. When the dosage-dispensing device is in its operating state, the delivery portion is located in the lower part of the delivery- and closure element where the latter has an end surface that is inclined at an oblique angle relative to a plane that extends orthogonal to the central lengthwise axis. At its lowest point, this end surface forms a tip where it coincides with a point of the cylindrical surface, and the topmost point likewise coincides with a point of the cylindrical surface.

In a further advantageous embodiment, the delivery- and closure element in its basic configuration is of a cylindrical shape and has a cylindrical closure portion that serves to close off the outlet orifice, and it further has, adjacent to the closure portion, a delivery portion that serves to deliver the substance to be dispensed and has at least one recess indented from the cylinder wall surface.

Thus, the delivery portion of the delivery- and closure element is shaped so that when the delivery portion of the delivery- and closure element is positioned in the outlet orifice, an effective outlet orifice, i.e., a passage opening, is left free which is arranged off-center and has a non-concentric configuration. With a translatory displacement of the delivery- and closure element along the central lengthwise axis of the dosage-dispensing device, the passage opening, i.e., the part of the outlet orifice through which the substance to be dispensed leaves the dosage-dispensing device during the dispensing operation, can be made continuously larger or smaller in a defined manner. Besides, the orientation of the passage opening relative to the central lengthwise axis is changed continually by the rotation.

This variable effective outlet orifice or passage opening offers in particular the possibility to deliver larger or smaller substance quantities as needed, for example powder in the microgram range. In a dosage-dispensing process, a large substance quantity can thus be delivered in a first phase with a relatively large passage opening, and as a given target quantity is being approached, the passage opening can be reduced by the translatory movement of the delivery- and closure element in such a way that only a very small flow of substance is delivered and the target quantity can therefore be met with the utmost accuracy. Thus, unless the outlet orifice is completely closed off, the passage opening always has a defined cross-section that is optimized for the substance to be dispensed.

The at least one recess of the delivery portion indented in the cylinder wall surface can be configured in the shape of a cutout and/or a groove and/or a triangular groove or notch. In particular, the width and depth of the recess vary in such a way that the profile area of the recess diminishes towards the closure portion.

In a specific embodiment, the delivery- and closure element is connected to a rod which is arranged along the central lengthwise axis and which traverses the supply container as a driving shaft, and the conveying tool is constrained in relation to the rod and the delivery- and closure element in such a way that the conveying tool is capable of translatory displacement along the central lengthwise axis.

The conveying tool is constrained and guided on the rod through a holder device with ring-shaped elements embracing the rod at two positions above each other, whereby the conveying tool is loosely constrained to the rod. Alternatively, a portion of the rod can have one or two grooves extending over the entire length of the rod, and the conveying tool can have a holder ring that is arranged to loosely surround the rod, with two projections of the holder ring engaged in the grooves. In the area of the grooves the rod can have a take-along portion in the form of a section with an enlarged diameter in comparison to other parts of the rod.

In principle, the delivery- and closure element and the conveying tool can be designed with the capability to move or to be driven independently of each other.

In a particularly advantageous further developed embodiment, the dosage-dispensing device has a housing that narrows down towards the outlet orifice.

The dosage-dispensing device is hereinafter described through examples that are represented schematically in the drawings, wherein:

FIG. 13b shows the first delivery- and closure element, rotated at a 90° angle relative to the illustration of FIG. 13a;

FIG. 14b shows a sixth embodiment of the delivery- and closure element, rotated at a 90° angle relative to the illustration of FIG. 14a;

FIG. 15b shows the third embodiment of the delivery- and closure element, rotated at a 90° angle relative to the illustration of FIG. 15a;

Figure 1:
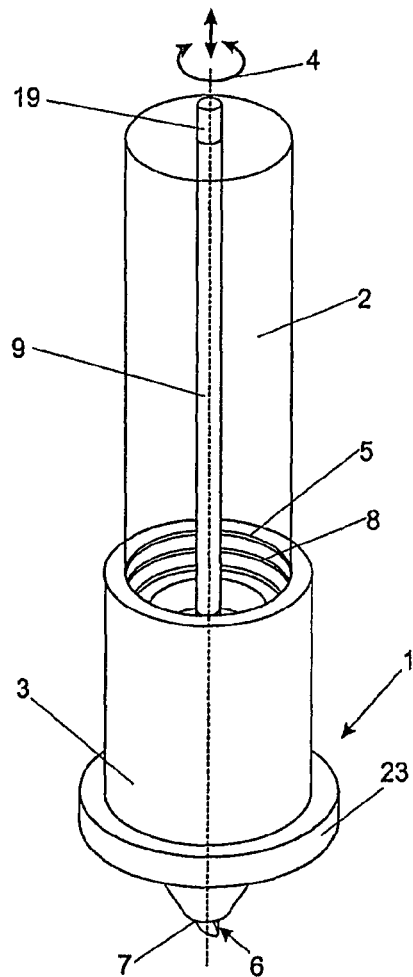
FIG. 1 illustrates in a three-dimensional drawing a dosage-dispensing device with a dosage-dispensing head screwed on to a supply container.

FIG. 1 shows a dosage-dispensing device for substances in powder- or paste form which includes a dosage-dispensing head 1 and a supply container 2. The dosage-delivery device has in essence an axially symmetric configuration. In its operating position, for example in a dosage-dispensing process, or when it is ready to operate, the dosage-delivery device is oriented with its central lengthwise axis 4 directed vertically. In the arrangement of FIG. 1, the dosage-dispensing head 1 which has a housing 3 is located below the supply container 2. It is joined to the supply container 2, and prior to filling the supply container, the dosage-dispensing head is screwed onto the supply container by means of an internal screw thread 5 of the dosage-dispensing head 1 and an external screw thread 8 of the supply container 2. In principle, the dosage-dispensing head can be releasably connected to the supply container through any state-of-the-art connection, or it can also have a fixed connection to the supply container. However, to facilitate cleaning, a dosage-dispensing head 1 that can be set or screwed onto the supply container 2 is preferable.

The housing 3 has a projecting ledge 23 which serves for example to fasten the dosage-dispensing device in a holder that is not shown here. The housing 3 is narrowed down towards the outlet orifice 7 in order to improve the way in which the substance to be dispensed is directed towards the outlet orifice 7. However, although this narrowed-down shape is preferred, it is not an absolute requirement.

A rod 9 that is connected to a delivery- and closure element 6 and forms a drive shaft passes through the supply container 2 and, as shown in FIG. 1, has one end protruding from the supply container 2. At the protruding end, the rod 9 has a coupling area 19 for a drive source which is not shown here and which may be a manual or motorized drive mechanism.

Figure 2A:
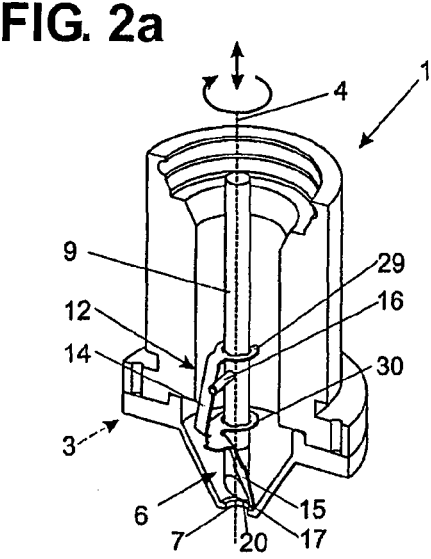
FIG. 2a illustrates in a three-dimensional drawing a dosage-dispensing head with a first embodiment of the delivery- and closure device in the open position and with a first embodiment of the conveying tool, with the housing of the dosage-dispensing head cut open in the lengthwise direction.

FIG. 2a shows a dosage-dispensing head 1 with a first embodiment of a delivery- and closure element 6 in a three-dimensional representation, wherein the housing 3 of the dosage-dispensing head 1 is cut open lengthwise. The dosage-dispensing head 1 is shown in FIG. 2a with the outlet orifice 7 in the open condition. The delivery- and closure element 6 is in fixed connection with the rod 9 which extends along the central lengthwise axis 4 of the dosage-dispensing head 1 or of the dosage-dispensing device. The rod 9, and thus the delivery- and closure element 6, is configured to be rotatable about the central lengthwise axis 4 as well as capable of translatory movement along the latter. The rod 9 in this arrangement is preferably driven by a motor.

It is considered self-evident that the delivery- and closure element 6 can also be of one piece together with the rod 9.

Figure 2B:
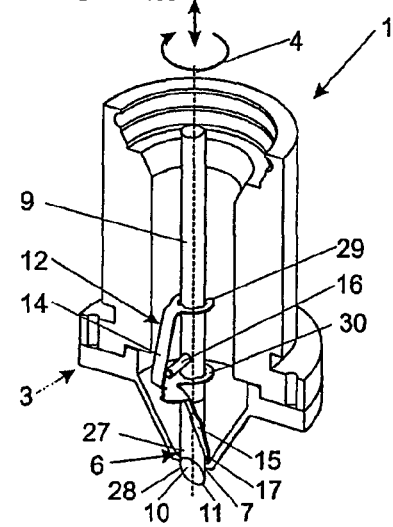
FIG. 2b illustrates in a three-dimensional drawing a dosage-dispensing head with a first embodiment of the delivery- and closure device in the closed position and with a first embodiment of the conveying tool, with the housing of the dosage-dispensing head cut open in the lengthwise direction.

FIG. 2b shows the dosage-dispensing head in an analogous representation as in FIG. 2a, with the difference that the outlet orifice 7 in FIG. 2b is completely closed off by the delivery- and closure element 6. The opening and closing of the outlet orifice 7 takes place by moving the delivery- and closure element 6 along the central lengthwise axis 4, i.e. vertically in the arrangement of FIGS. 2a and 2b.

The delivery- and closure element 6 has a closure portion 27 which is configured cylindrically and which in the closed position (see FIG. 2b) closes the outlet orifice 7 with an exact fit. When a dosage-dispensing activity is in progress, the outlet orifice 7 is either fully opened as shown in FIG. 2a, or it is at least partially open and thereby forms a passage opening which corresponds to an effective outlet orifice. In this at least partially opened condition, a delivery portion 28 which is arranged adjacent to the closure portion 27 of the delivery- and closure element 6 reaches into the outlet orifice 7.

The delivery portion 28 which in the operative condition of the dosage-dispensing device is located in the lower part of the delivery- and closure element has an end surface which is obliquely biased relative to a plane that is orthogonal to the central lengthwise axis. As a result, a delivery surface 10 is formed which in the embodiment of the delivery- and closure element 6 shown in FIGS. 2a and 2b forms a tip 11 at its lowest point which coincides with a point of the cylinder wall surface, and the topmost point of the delivery surface coincides likewise with a point of the cylinder wall surface.

The delivery surface 10 in the representation shown here is drawn as a planar surface. However, the delivery surface 10 can also be configured as a surface that is inward-curved in one or in two dimensions, i.e., in two mutually orthogonal directions. In other words, it can be configured as a concave surface. Furthermore, a delivery surface is conceivable with a concave curvature in one arbitrary direction or in two directions that are not orthogonal to each other, i.e. in two arbitrary directions (see for example FIGS. 14a to 14c) and which may in some cases have a spiraling twist about the central lengthwise axis.

For the dispensing, i.e. with the outlet orifice 7 in its open position, the delivery- and closure element 6 is either retracted completely from the outlet orifice 7, which is the case in the completely open position, or the delivery portion 28 of the delivery- and closure element 6, i.e. the area that includes the delivery surface 10, reaches in part into the outlet orifice 7 and leaves a passage opening for the passage of the substance to be dispensed. However, in order to completely close off the outlet orifice 7, a part of the delivery- and closure element 6 that lies outside the area with the delivery surface 10, namely the closure portion 27, needs to reach into the outlet orifice 7. The latter has a diameter equal to the diameter of the delivery- and closure element 6 in the closure portion 27, so that the delivery- and closure element 6 can be moved into and out of the outlet orifice 7 with a precise fit whereby the outlet orifice 7 can be completely closed. When the delivery- and closure element 6 is moved so that its delivery portion 28 reaches into the outlet orifice 7, the latter is made smaller in comparison to the completely open position. This allows a targeted control of the delivery of substances in powder- or paste form, as the delivery portion of the delivery- and closure element 6 reaches at any moment more or less deeply into the outlet orifice 7 and thereby forms a passage opening of variable size. For powder of a fine grain size and a loose-flowing consistency, the dosage-dispensing head 1 of the foregoing description can achieve a volume flow that allows doses in the microgram range to be dispensed. The preferred means for measuring the delivered substance quantity is a balance, which is not shown in the drawing as it is not a subject of the invention.

For the dispensing of pulverous substances with poor pouring properties, i.e. for example cloggy powders, or for the dispensing of pasty substances, there is a conveying tool 12 arranged inside the dosage-dispensing head 1. The conveying tool 12 has a supporting and guiding device with ring-shaped holders embracing the rod 9 in two positions above each other, whereby the conveying tool 12 is loosely connected to the rod 9. The conveying tool 12 further has a stirrer part 14 and a conveying element 15 shaped like a scraper or a shovel.

The upper ring-shaped holder 29 of the conveying tool 12 which is shown in FIGS. 2a and 2b is arranged above a transverse bolt 16 that is solidly connected to the rod 9, while the lower ring-shaped holder 30 is arranged below the transverse bolt 16. With this arrangement, the conveying tool 12 is guided and constrained in the dosage-dispensing device. With a translatory movement of the rod 9 along the central lengthwise axis 4, i.e., when the outlet orifice 7 is opened or closed, the loose attachment of the conveying tool 12 to the rod 9 ensures that, due to the force of gravity, the rod 9 always remains movable relative to the conveying tool 12 and the latter therefore always remains in loose contact with the edge 20 of the housing 3, hereinafter referred to as the rim of the outlet orifice 7. Furthermore, as the rod 9 rotates, the transverse bolt 16 is brought into contact with the stirrer part 14 and pushes the conveying tool 12 to participate in the rotation.

The stirrer part 14 serves to loosen the substance to be dispensed during the time while the substance is in the area of the dosage-dispensing head 1.

As already mentioned, the conveying element 15 remains in contact with the rim of the outlet orifice 7 also when the delivery- and closure element 6 is in the open position, so that with the rotation of the delivery- and closure element 6, the substance to be dispensed is conveyed to the outlet orifice and if particles remain clinging to the outlet orifice 7 they are released and the dosage material is delivered. The conveying element 15 preferably includes an extensive smooth surface portion with a tip 17 facing towards the rim of the outlet orifice 7, wherein the tip 17 is in loose contact with the rim of the outlet orifice 7. The conveying element 15, more specifically its extensive smooth surface portion, preferably has a curved shape, so that it can act like a shovel to take along strongly coagulated powder and direct it to the outlet orifice 7.

Due to the rotation of the conveying tool 12 about the central lengthwise axis 4, the conveying element 15 moves on a circular path. It has proven to be advantageous if the conveying element 15 is positioned at an acute angle in the tangential direction relative to the circular path traveled by the conveying element 15 in its rotation about the central lengthwise axis 4, and/or the conveying element 15 is slanted at an acute angle relative to the central lengthwise axis 4. The conveying element 15 is further oriented at an acute angle relative to the radius of its circular path and touches the rim of the outlet orifice 7 tangentially. At that location, the conveying element has a sharp edge to clear the rim of strongly coagulating dispensing material which is stuck there. The shape and orientation of the conveying element 15 in the conveying tool 12, in particular the angle of the conveying element 15, is adapted to the consistency of the substance to be dispensed. If necessary, a conveying tool can be exchanged for another one. The shape and orientation of the conveying tool 12 determines the sense of rotation of the delivery- and closure element 6 and thus of the conveying tool 12 for the embodiment of the dosage-dispensing device shown in FIGS. 2a and 2b. The rotation in the illustrated case is clockwise.

Figure 3A:
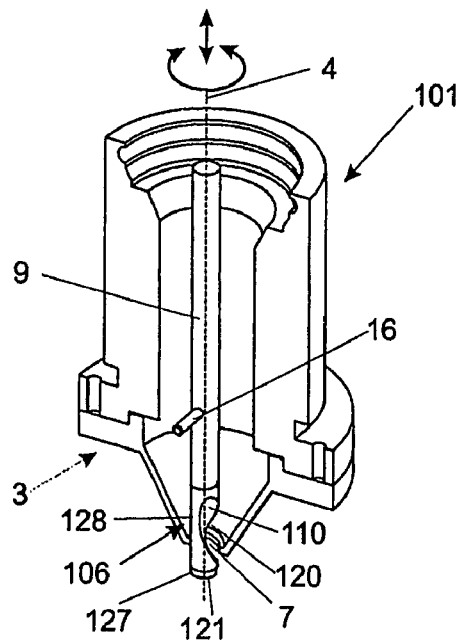
FIG. 3a illustrates in a three-dimensional drawing a dosage-dispensing head with a second embodiment of the delivery- and closure element in the open position, with the housing of the dosage-dispensing head cut open in the lengthwise direction.

FIG. 3a shows a dosage-dispensing head 101 with a second embodiment of a delivery- and closure element 106 in a three-dimensional representation wherein the housing 3 of the dosage-dispensing head 101 is cut open lengthwise. The outlet orifice 7 is partially opened. Components that are identical to those shown in FIGS. 1 to 2b are identified with the same reference symbols and their description is not repeated here. The conveying tool 12 which is of the same kind as shown in FIGS. 2a and 2b has been omitted from the drawing in the interest of clarity, while the transverse bolt 16 that serves to drive the conveying tool 12 is still shown.

Figure 3B:
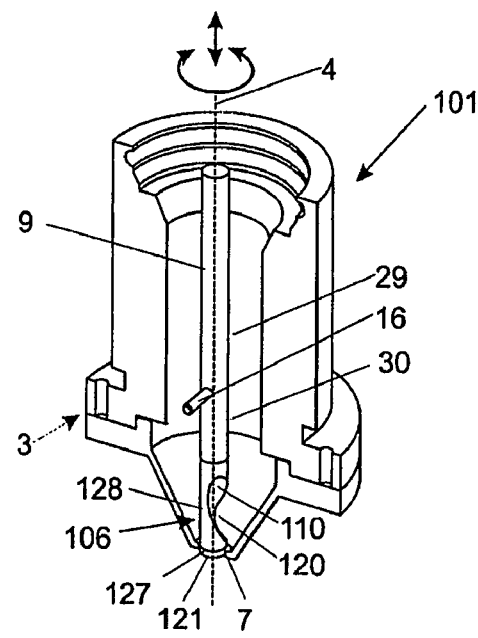
FIG. 3b illustrates in a three-dimensional drawing a dosage-dispensing head with a second embodiment of the delivery- and closure element in the closed position, with the housing of the dosage-dispensing head cut open in the lengthwise direction.

In the portion of the delivery- and closure element 106 which is designed to move into and out of the outlet orifice with a movement along the central lengthwise axis 4, the delivery- and closure element 106 has an indentation in the form of a recess 120. The recess 120 has a continuous surface which forms a delivery surface 110. The recess 120 lies in and forms the delivery portion 128 of the delivery- and closure element 106 whose basic shape is cylindrical. In this embodiment, and in the operation-ready orientation of the dosage-delivery device, the closure portion 127 is arranged below the delivery portion 128, meaning that the closure portion 127 forms the outer end of the delivery- closure element 106. With this arrangement, the surface 121 that forms the bottom end of the delivery- and closure element 106 can close the outlet orifice 7 of the dosage-dispensing head 101 in flush alignment as shown in FIG. 3b. The outlet orifice 7 in this arrangement has a diameter which substantially matches the diameter of the delivery- and closure element 106 in its closure portion 127, so that the delivery- and closure element 106 can be moved into and out of the outlet orifice 7 with an exact fit, so that the outlet orifice 7 can be completely closed.

In principle, the outlet orifice 7 in the illustrated version of the delivery- and closure element 106 could also be closed by means of the portion of the delivery- and closure element 106 that is located above the recess 120. However, a closure of the outlet orifice with a flush alignment is preferred, because it reduces the risk that some of the substance remains clinging to the delivery- and closure element.

The delivery surface 110 is a surface that is curved at least in one direction and has a spiraling twist about the central lengthwise axis. However, the delivery surface could also be curved in two directions in the area of the recess 120 and/or have a spiraling twist about the central lengthwise axis 4. The width as well as the depth of the recess 120 in the delivery portion 128 become smaller in the direction towards the closure portion 127.

When the delivery- and closure element 106 is moved along the central lengthwise axis 4, the recess 120 gets positioned in the area of the outlet orifice 7 whereby the latter is partially opened, forming a passage opening that allows substances in powder- or paste form to pass through.

A concave curvature of the surface 110 and in particular a slightly spiraling shape of the recess 120 about the central lengthwise axis has the effect that with the rotation of the delivery- and closure element 106 the substance to be delivered is taken along and delivered in a controlled manner by the delivery surface 110. This is of particular advantage in the case of coagulating substances which with a delivery surface 110 without curvature could possibly get stuck between the rim of the outlet orifice 7 and the delivery surface 110, whereby the outlet orifice 7 could become clogged up. The direction in which the delivery- and closure element 106 rotates for the dispensing of substance is adapted to the configuration of the delivery portion 128.

Figure 4:
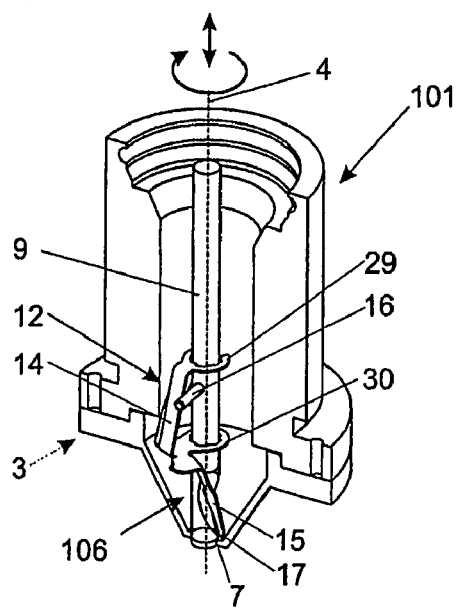
FIG. 4 shows the dosage-dispensing head of FIG. 3b with the addition of a first embodiment of the conveying tool.

With strongly coagulating powders it is of considerable advantage to use a conveying tool 12 with a wiper-shaped or shovel-shaped conveying element 15 of the kind illustrated in FIG. 4 in connection with a delivery- and closure element 106 according to FIGS. 3a and 3b, wherein the conveying tool 12 cooperates with the delivery- and closure element 106.

As already mentioned above, the conveying tool 12 is held or guided on the rod 9 in such a way that on the one hand the conveying tool 12 participates in the rotation of the rod 9 but on the other hand keeps its position when the rod 9 is displaced along the central lengthwise axis, which means that the conveying tool 12, particularly the tip 17 of the conveying tool, always remains in loose contact with the rim of the outlet orifice 7, and that in the dispensing process the conveying tool 12 directs the powder towards the rim, pushes the powder downward, and wipes it off the rim. This is illustrated in FIGS. 5a and 5b which show a sectional drawing of the dosage-dispensing head 101.

Figure 5A:
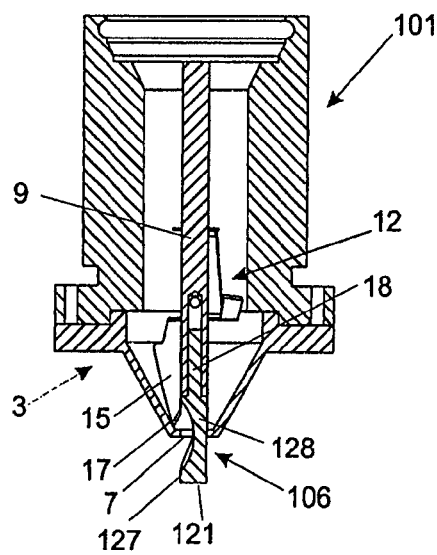
FIG. 5a shows a sectional view of the dosage-dispensing head of FIG. 4 with the delivery- and closure element in the open position.
Figure 5B:
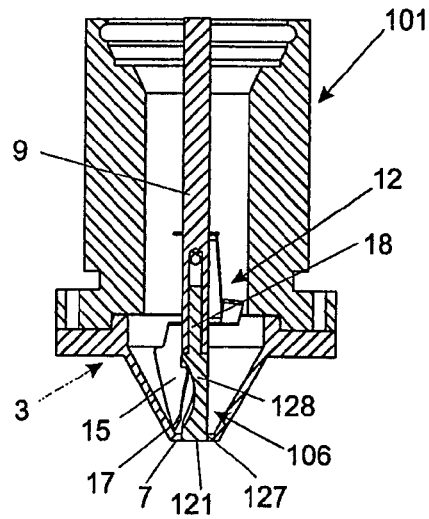
FIG. 5b shows a sectional view of the dosage-dispensing head of FIG. 4 with the delivery- and closure element in the closed position.

With the form of representation that was chosen for FIGS. 5a and 5b it is also possible to see how the delivery- and closure element 106 is connected to the rod 9. A bolt 18 of a smaller diameter than the diameter of the delivery- and closure element 106 is inserted in the rod 9 and is for example screwed, glued, soldered or otherwise fixedly connected to the latter.

Figure 6A:
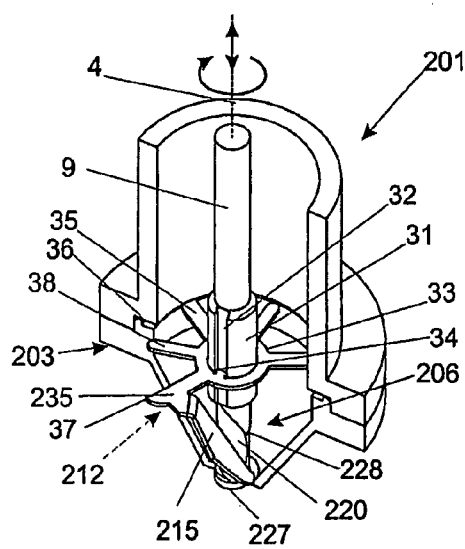
FIG. 6a shows in a three-dimensional view a dosage-dispensing head with a third embodiment of the delivery- and closure element in the closed position and with a second embodiment of the conveying tool, with the housing of the dosage-dispensing head cut open in the lengthwise direction.
Figure 6B:
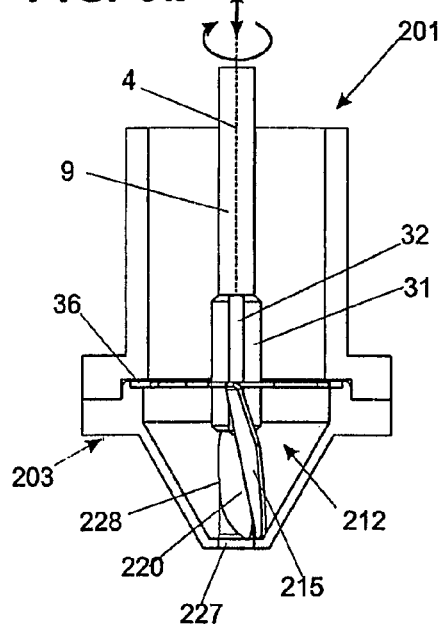
FIG. 6b shows a side view of the dosage-dispensing head of FIG. 6a with the housing cut open in the lengthwise direction.
Figure 6C:
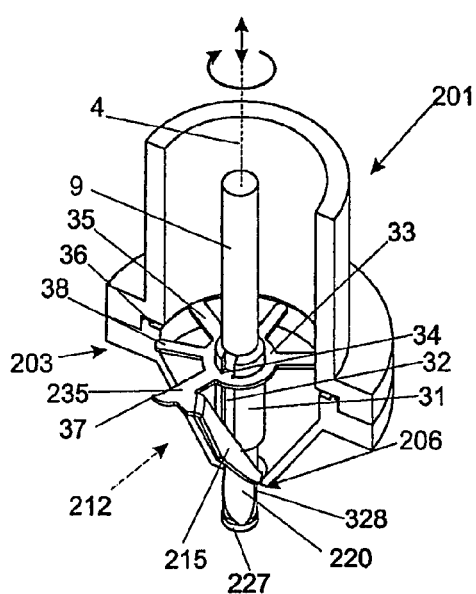
FIG. 6c shows the dosage-dispensing head of FIG. 6a with the delivery and closure element in the open position.
Figure 6D:
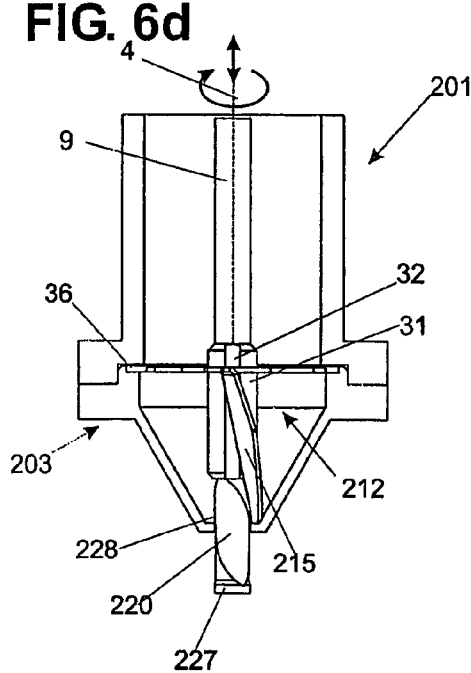
FIG. 6d shows the dosage-dispensing head of FIG. 6b with the delivery and closure element in the open position.

FIGS. 6a to 6d illustrate a third embodiment of the delivery- and closure element 206 and its arrangement in the dosage-dispensing head 201 in the closed position as well as in the open position. FIGS. 6a and 6c show the dosage-dispensing head in a perspective view, while FIGS. 6b and 6d show the same in a side view, wherein in each case the housing 203 is cut open lengthwise. The delivery portion 228 has a recess 220 with a concave-shaped delivery portion 210. The borders of the recess 220 are not arranged parallel to the plane that extends orthogonal to the central lengthwise axis 4, but are inclined at an arbitrary angle relative to the latter. A recess 220 of this kind can be produced by means of a cylindrical cut directed at an angle different from 90° relative to the central lengthwise axis 4. The delivery portion 228 and the closure portion 227 have slightly different diameters, so that the outlet orifice 7 can be closed off hermetically, but in its open condition still leaves sufficient clearance for the movement of the delivery- and closure element 206.

The conveying tool 212 shown in FIGS. 6a to 6d has a conveying element 215 of a configuration similar to the conveying elements shown in FIGS. 4, 5a and 5b. In particular, the conveying element 215 is oriented relative to the central lengthwise axis 4 at an acute angle in the tangential direction relative to the circular path traveled by the conveying element in its rotation about the central lengthwise axis 4, and it is inclined at an acute angle relative to the central lengthwise axis 4. Furthermore, the conveying element 215 is positioned at an angle relative to the radius of its circular path, and it touches the rim of the outlet orifice 7 tangentially. A take-along section 31 of the rod 9 with at least one groove 32 extending along its entire length serves to support and constrain the conveying tool 212. A holder ring 33 of the conveying tool 212 is arranged so that it loosely surrounds the take-along section 31 and engages the groove 32 with a projection 34. Preferably, there are two grooves 32 and two projections 34 lying opposite each other, of which the second groove and the second projection would be invisible in the drawing as they would be hidden behind the rod 9. Thus, the conveying tool 212 is constrained to participate in the rotation of the rod 9 but remains free for translatory movement along the central lengthwise axis 4. Arranged on the holder ring 33 are several radial arms 35 projecting outwards from the central lengthwise axis 4 and reaching with their tips 37 into a circular groove in the housing 203 where they are movably guided. Further radial arms without tips serve as stirrer elements 38. The holder ring 33, the projection 34, the radial arms 35 and the stirrer elements 38 lie in a plane that extends orthogonal to the central lengthwise axis 4. However, the stirrer elements 38 can also be bent upwards or downwards, whereby their ability to loosen the substance to be dispensed is improved. The conveying element 215 is preferably connected with one of the radial arms 235, being formed out of one piece with the latter. The entire conveying tool 212 is preferably made in one piece out of sheet metal or from a plastic material.

Figure 7A:
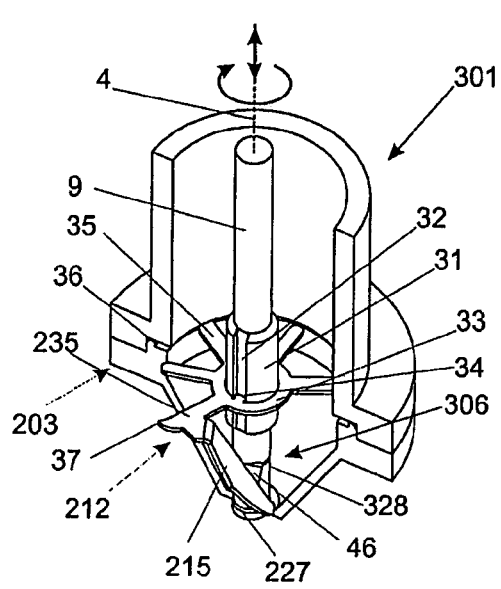
FIG. 7a illustrates in a three-dimensional drawing a dosage-dispensing head with a fourth embodiment of the delivery- and closure element in the closed position and with the embodiment of the conveying tool according to FIG. 6a, with the housing of the dosage-dispensing head cut open in the lengthwise direction.
Figure 7B:
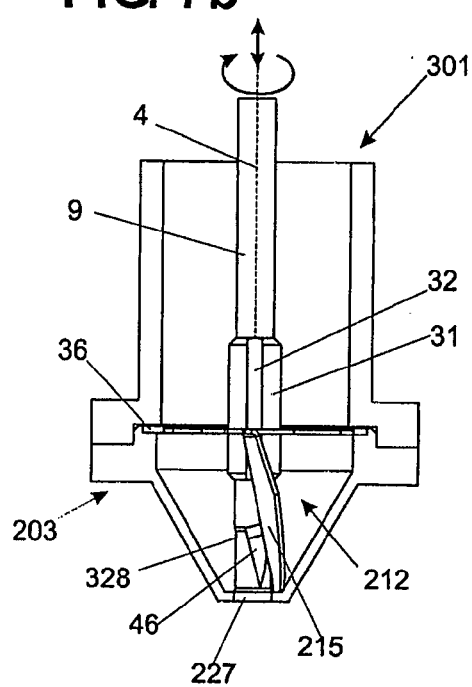
FIG. 7b shows a side view of the dosage-dispensing head of FIG. 7a with the housing cut open in the lengthwise direction.

A fourth embodiment of the delivery- and closure element 306 which closes off the outlet orifice 7 can be seen in a three-dimensional representation of the dosage-delivery head 301 in FIG. 7a and in a side view in FIG. 7b, wherein in both drawings the housing 303 is cut open lengthwise. The delivery portion 328 of the delivery- and closure element 306 in this embodiment is configured as a groove or notch 46 that is arranged on the side, i.e., off-centered, and narrows down to a point at the bottom, i.e., having a variable width and depth that decrease towards the closure portion 227. The delivery surface is in this case discontinuous. In a filling process, the delivery surface takes hold of the substance to be dispensed and, by means of the rotation, dispenses it. The downward-converging shape of the groove provides at the same time a passage opening that is continuously variable depending on the position of the delivery- and closure element 306 within the outlet orifice 7. There can also be several grooves or notches 46 arranged preferably at regular intervals around the circumference of the delivery portion. This means that the delivery portion has several cylindrical sectors which are adjoined by the notches 46 forming delivery sectors in an arrangement where cylindrical sectors are interrupted by the notches. The notches 46 can be oriented with their tips pointing vertically downward as shown in FIGS. 7a and 7b, or they can also be worked into the delivery portion at an oblique angle.

Figure 8A:
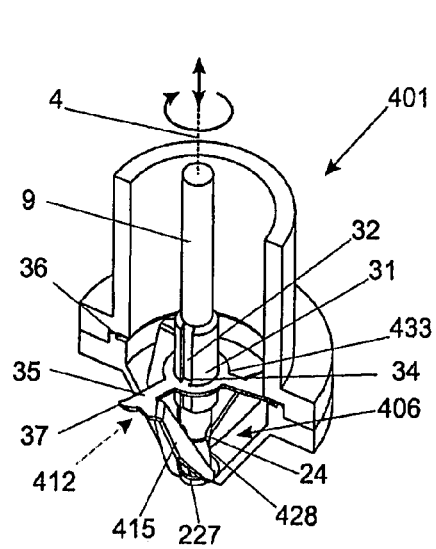
FIG. 8a illustrates in a three-dimensional drawing a dosage-dispensing head with a fifth embodiment of the delivery- and closure element in the closed position and with a third embodiment of the conveying tool, with the housing of the dosage-dispensing head cut open in the lengthwise direction.
Figure 8B:
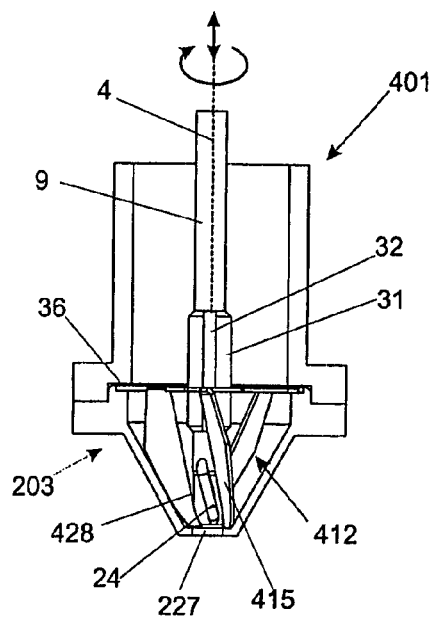
FIG. 8b shows a side view of the dosage-dispensing head of FIG. 8a with the housing cut open in the lengthwise direction.

FIGS. 8a and 8b illustrate a dosage-dispensing head 401 in a form of representation that is analogous to FIG. 7. This dosage-dispensing head 401 includes a fifth embodiment of the delivery- and closure element 406 and a third embodiment of the conveying tool 412. In its closure portion 227, the delivery- and closure element 406 is configured like the third and fourth embodiments of the delivery- and closure element, but its delivery portion 428 has several oblong grooves 24 of variable depth and width in the circumference of the substantially cylinder-shaped delivery- and closure element 406. In their lengthwise direction, these grooves are oriented at an acute angle relative to the central lengthwise axis 4. In the open state of the delivery- and closure element 406, the grooves 24 thus constitute a plurality of passage openings for the substance to be delivered.

The conveying tool 412 has three conveying elements 415 which are integrally connected to a holder ring 433. The holder ring 433 is constrained to the rod 9 through a take-along section 31 with grooves 32 engaged by projections 34 in the same manner as has already been described above in the context of FIGS. 6a to 6d. In contrast to the embodiment shown in FIGS. 6a to 6d, the conveying tool 412 shown here has no stirrer elements 38, although they could be added. However, the function of stirring and loosening the substance to be delivered can also be performed by the three outward-projecting arms 435 as well as the three conveying elements 415. The latter are configured and oriented in the dosage-dispensing head substantially like the conveying element 215 described above in the context of the FIGS. 4 to 7. The three outward-projecting arms 435, each of which is connected to a conveying element 415, have tips 37 that are movably guided in the circular groove 36 of the housing 3.

Figure 9A:
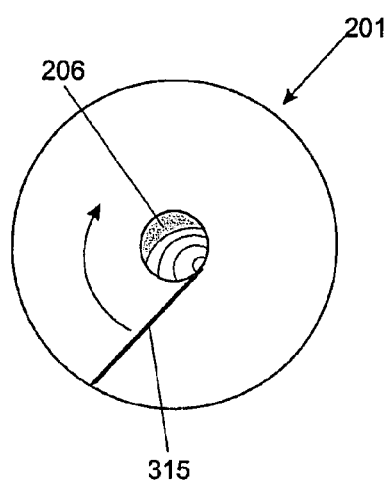
FIG. 9a shows a strongly simplified schematic view from above into a dosage-dispensing head, wherein the third embodiment of the delivery- and closure element is shown in cross-section in the area of the outlet orifice 7.
Figure 9B:
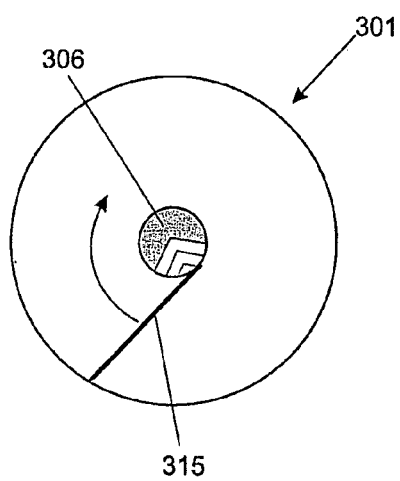
FIG. 9b shows a strongly simplified schematic view from above into a dosage-dispensing head, wherein the fourth embodiment of the delivery- and closure element is shown in cross-section in the area of the outlet orifice.

FIGS. 9a and 9b show strongly simplified schematic views from above into the dosage-dispensing heads 201 and 301, respectively, with the respective delivery- and closure elements 206, 306 represented in a sectional view in the area of the outlet orifice 7. This serves to visualize the shapes that the respective passage openings will take. Of the conveying tool, FIGS. 9a and 9b each show a conveying element 315 which for simplicity's sake is drawn as a sheet metal part delimited by planar surfaces, as seen from the topside. The conveying element 315 is positioned at an acute angle relative to the radius of its circular path and tangentially touches the rim of the outlet orifice 7, whereby with a rotation (see arrow) of the delivery- and closure element 206, 306 and of the conveying tool the substance to be delivered is directed to the passage opening.

As already mentioned above, a conveying element can also be positioned at an acute angle in the tangential direction relative to the circular path traveled by the conveying element in its rotation about the central lengthwise axis 4, and/or the conveying element can be slanted at an acute angle relative to the central lengthwise axis 4. These angles can be varied depending on the substance to be dispensed, for example by exchanging the conveying tool in the dosage-dispensing device.

Further positions of the delivery- and closure element 206, 306 by which an effective delivery orifice or passage opening is delimited are indicated by a series of broken lines progressing from the upper left to the lower right of the passage opening shown in FIGS. 9a and 9b. It is considered self-evident that the broken lines are only representative examples for a continuous variation of the passage opening.

Figure 10A:
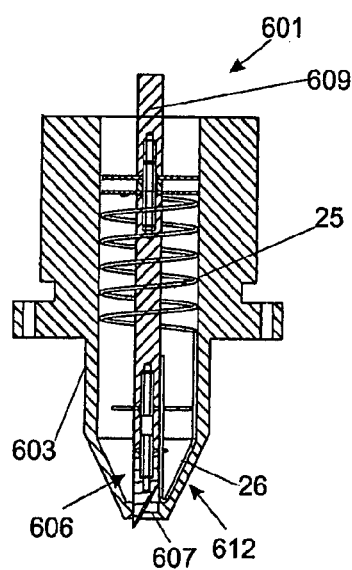
FIG. 10a shows a sectional view of a further configuration of a dosage-delivery head with its outlet orifice open, in the first embodiment of the delivery- and closure element and with a fourth embodiment of the conveying tool.

A further form of the dosage-dispensing head 601 is shown in FIG. 10a in a sectional view. In comparison to the embodiments described above, the dosage-dispensing head 601 is lengthened somewhat and uses an elastic arm 26 of wire or plastic, preferably in connection with a helix spring 25, as a conveying tool 612. The elastic arm 26 is shaped so that it follows the contour of the internal wall of the housing 603 with a small amount of play and breaks at an acute angle at the outlet orifice 607 to continue along the contour of the rod 609. When substance is being dispensed, the wire- or plastic arm 26 moves on a circular path, sharing the rotation of the rod 609. The wire- or plastic arm 26 is shaped so that, to perform its function as a conveying tool 612, it is inclined in the direction of its rotation at an acute angle to the plane of its circular path. This conveying tool 612 is likewise constrained in such a way that it always remains in loose contact with the rim of the outlet orifice 607 due to the effect of the helix spring 25. The delivery- and closure element 606 is substantially analogous to those of FIGS. 2a and 2b which were described above in context with the latter.

Figure 10B:
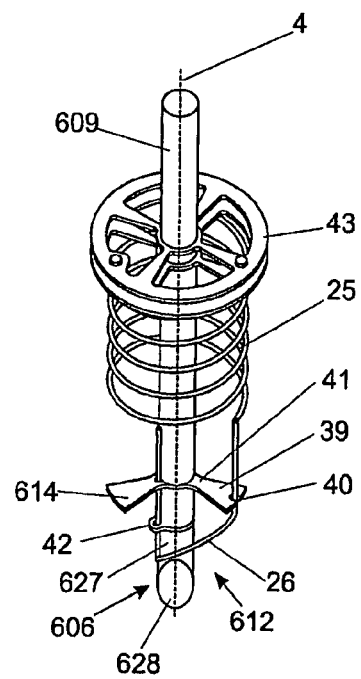
FIG. 10b shows the conveying tool of FIG. 10a, loosely connected to a rod, in a three-dimensional representation.

FIG. 10b gives a perspective view of the conveying tool 612 which is constrained to the rod 609 by way of the helix spring 25. Serving as a holder for the conveying tool 612 is a three-winged stirrer part 614 (of which only two wings are visible) which is solidly connected to the rod 609 and has two eyelets 40, 41 in one wing 39 in which the wire- or plastic arm 26 is loosely held. A further eyelet 42 constraining the wire- or plastic arm 26 is located somewhat below the stirrer part 614 and is connected to the rod 609 by means of a ring. The helix spring 25 bears from below against a wheel 43 consisting of two perforated disks, which is connected to the rod and serves to guide the latter inside the dosage-dispensing head 609. Thus, the conveying tool 612 participates in the rotation of the rod. In the case of a translatory displacement of the rod 609 and thus of the delivery- and closure element 601, the force of the spring 25 which is compressively biased in the closed as well as open condition of the delivery- and closure element 606 urges the conveying tool 612 against the rim of the outlet orifice 607.

Figure 11A:
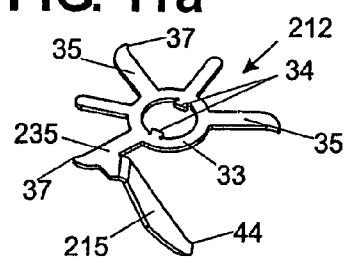
FIG. 11a shows the conveying tool of FIGS. 6 and 7 in a three-dimensional representation, as seen at an oblique angle from above.
Figure 11B:
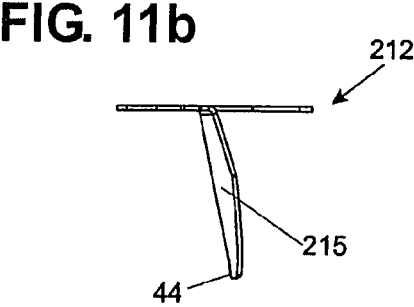
FIG. 11b shows the conveying tool of FIGS. 6 and 7 in a side view.
Figure 12A:
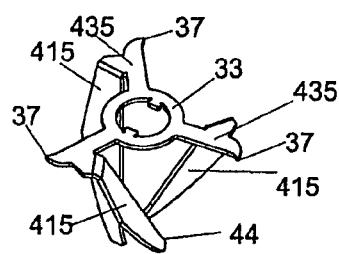
FIG. 12a shows the conveying tool of FIG. 8 in a three-dimensional representation, as seen at an oblique angle from above.
Figure 12B:
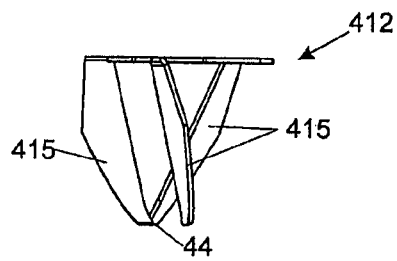
FIG. 12b shows the conveying tool of FIG. 8 in a side view.

FIGS. 11a and 11b show the conveying tool 212 of FIGS. 6 and 7 in a three-dimensional representation as seen, respectively, at an oblique angle from above and in a side view, while FIGS. 12a and 12b show the same forms of representation for the conveying tool 412 that can be seen in FIG. 8.

The conveying tool 212 has a conveying element 215 which is integrally connected with a projecting arm 235. The part of the conveying element 215 that is always in loose contact with the rim of the outlet orifice has a curved tip 44 facing the rim of the orifice. The substance to be dispensed is removed from the rim of the outlet orifice by the tip 44 and directed towards the delivery- and closure element. The holder ring 33 has two projections 34 which, as described in the context of FIG. 6, are engaged in corresponding grooves 32 in the take-along section 31 of the rod 9. The conveying tool 212 is thereby constrained to participate in the rotation of the rod 9, but has free translatory mobility along the central lengthwise axis.

The third embodiment of the conveying tool 412, which is shown in FIGS. 12a and 12b, has three conveying elements 415. A conveying tool 412 of this type is particularly advantageous for example for the dispensing of strongly coagulating powders, because it allows the dispensing rate to be increased.

The drawings make it clear that a conveying element 215, 415 from its connection to the conveying tool towards the tip 44 is inclined at an angle relative to the vertical direction. This means that the conveying element 212, 412 of the conveying tool 215, 415 is slanted in its direction of rotation under an acute angle relative to the plane of its circular path. The conveying tool is further slanted at an angle towards the outside and is positioned at an angle relative to the radius of the holder ring 33. As a result of this and due to a surface curvature of the conveying element 215, 415, the sense of rotation is substantially given.

Figure 13A:
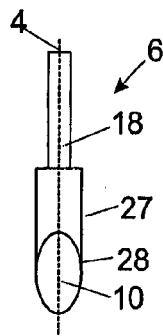
FIG. 13a shows the first delivery- and closure element as seen from the side with the view directed at the delivery surface.
Figure 13B:
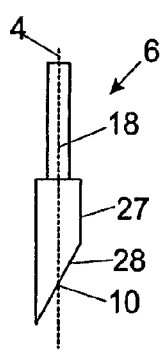
Figure 13C:
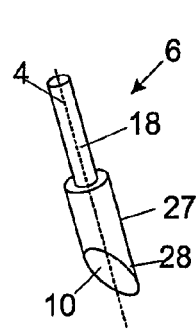
FIG. 13c shows the first delivery- and closure element in a three-dimensional representation.

FIG. 13 shows the delivery- and closure element 6 of FIGS. 2a and 2b in different views. The illustration includes the delivery- and closure element 6 with the bolt 18 for the attachment to the rod 9. FIG. 13a shows the delivery- and closure element 6 from the side with a view at the delivery surface 10, FIG. 13b shows the same in a position that is rotated by 90° relative to the representation of FIG. 13a, and FIG. 13c shows the delivery- and closure element 6 in a three-dimensional view.

Figure 14A:
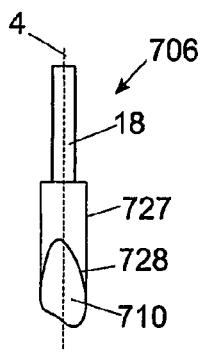
FIG. 14a shows a sixth embodiment of the delivery- and closure element as seen from the side with the view directed at the delivery surface.
Figure 14B:
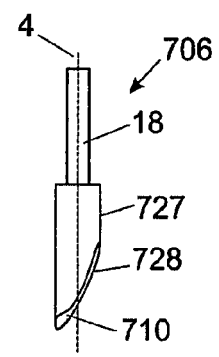
Figure 14C:
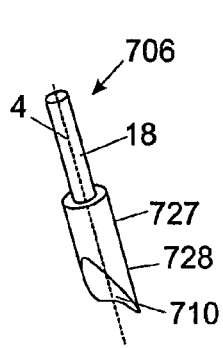
FIG. 14c shows a sixth embodiment of the delivery- and closure element in a three-dimensional representation.
Figure 15A:
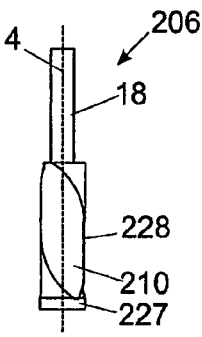
FIG. 15a shows the third embodiment of the delivery- and closure element as shown in FIGS. 6a to 6d, seen from the side with the view directed at the delivery surface.
Figure 15B:
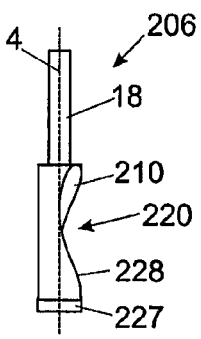
Figure 15C:
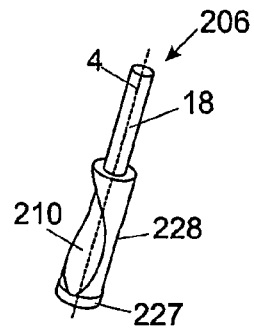
FIG. 15c shows the third embodiment of the delivery- and closure element in a three-dimensional representation.
Figure 15D:
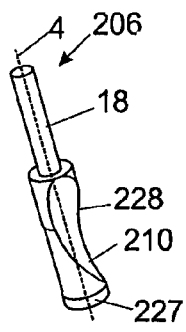
FIG. 15d shows the third embodiment of the delivery- and closure element in a three-dimensional representation.

FIG. 14 shows a seventh embodiment of a delivery- and closure element 706 with a tip, wherein the delivery portion 728 has a delivery surface 710 that is concave-shaped in two directions. This configuration of the delivery surface 710 has the advantage that it guides the substance to be dispensed to the outlet orifice 7. The delivery- and closure element 706 in FIG. 14 is shown in different views. In FIG. 14a it is seen from the side with a view of the delivery surface 710, while FIG. 14b shows the same in a 90°-rotated position relative to FIG. 14a, and FIG. 14c shows a three-dimensional view.

In this case, too, the width and depth get smaller towards the closure portion 727 due to the shape that the recess takes as a result of the concave-shaped configuration of the delivery portion 728.

FIG. 15 shows different views of the configuration of the delivery- and closure element 206 which has already been described in the context of FIGS. 6a to 6d. FIG. 15a shows the delivery- and closure element 6 from the side with a view at the delivery surface 210, FIG. 15b shows the same in a position that is rotated by 90° relative to the representation of FIG. 15a, and FIGS. 15c and 15d show the delivery- and closure element 206 in a three-dimensional view. The recess 220 in the delivery portion 228 is delimited by a concave-shaped delivery surface 210 which has borders that are not aligned parallel to the plane that runs orthogonal to the central lengthwise axis 4, but enclose an arbitrary angle with the central lengthwise axis 4. A recess of this shape can be produced by means of a cylindrical cut directed at an angle other than 90° to the central lengthwise axis 4.

FIGS. 15a to 15d further illustrate that the diameter in the delivery portion 228 is slightly smaller than in the closure portion 227. It is considered self-evident that the outlet orifice 7 of the dosage-dispensing head has a diameter that is matched to the closure portion 227, so that the outlet orifice 7 can be hermetically closed off but leaves enough clearance for the rotation in the open condition. This shape of a closure portion with a diameter that is different from the diameter of the delivery portion is also conceivable and can be realized for the delivery- and closure elements shown in the preceding drawing figures.

Figure 16A:
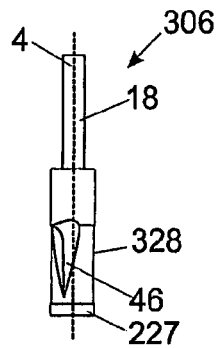
FIG. 16a shows the fourth embodiment of the delivery- and closure element as shown in FIGS. 7a and b, seen from the side with the view directed at the delivery surface.
Figure 16B:
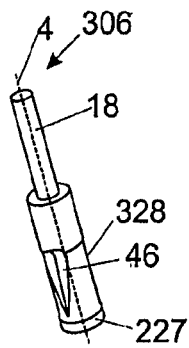
FIG. 16b shows the fourth embodiment of the delivery- and closure element in a three-dimensional representation.
Figure 16C:
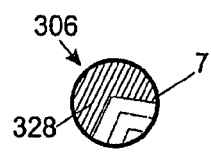
FIG. 16c shows the fourth embodiment of the delivery- and closure element in a sectional view in a plane that extends orthogonal to the central lengthwise axis in the area of the outlet orifice.

FIG. 16 shows different views of the fourth embodiment of the delivery- and closure element 306 which has already been described in the context of FIGS. 7a and 7b. FIG. 16a shows the delivery- and closure element 306 from the side with a view at the delivery surface, FIG. 16b shows the same in a three-dimensional representation. In a dosage-filling process, the groove or notch 46 which, besides, could also be oriented at an oblique angle relative to the direction of the central lengthwise axis 4 takes hold of the substance to be dispensed and, by rotating, directs it to the outlet orifice 7. Furthermore, this embodiment of the delivery- and closure element 306 likewise ensures a continuous opening and closing of the outlet orifice 7. As illustrated in FIG. 16c, showing a delivery- and closure element 306 according to FIGS. 16a and 16b in a sectional view of the area of the partially closed outlet orifice 7, the passage opening has a triangular cross-section wherein one side, specifically the side delimited by the rim of the outlet orifice 7, forms a circular arc. Of course, here too, the passage opening can be made continuously larger and smaller. In FIGS. 16a to 16c, only one notch 46 is arranged in the delivery portion 328. However, there could also be two notches 46 of this kind arranged on the delivery- and closure element 306, for example at opposite locations from each other. Here, too, the diameter in the delivery portion 328 is slightly smaller than in the closure portion 327.

Figure 17A:
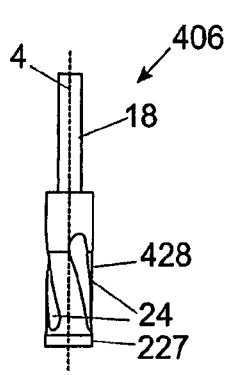
FIG. 17a shows the fifth embodiment of the delivery- and closure element as shown in FIGS. 8a and b, seen from the side with the view directed at the delivery surface.
Figure 17B:
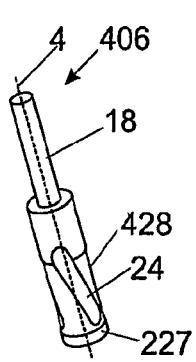
FIG. 17b shows the fifth embodiment of the delivery- and closure element in a three-dimensional representation.
Figure 17C:
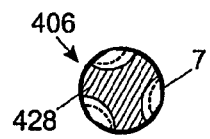
FIG. 17c shows the fifth embodiment of the delivery- and closure element in a sectional view in a plane that extends orthogonal to the central lengthwise axis in the area of the outlet orifice.

FIG. 17 represents the fifth embodiment of the delivery- and closure element 406 as shown in FIGS. 8a and 8b, with FIG. 17a showing the delivery- and closure element 406 from the side with a view at the delivery surface, and FIG. 17b showing the same in a three-dimensional representation. The oblong grooves 24 of variable depth and width, a plural number of which are arranged in the circumference of the substantially cylindrical delivery- and closure element 406 are produced for example by milling with a ball cutter. As shown in FIG. 17c, representing a section traversing the delivery- and closure element 406 of FIGS. 17a and 17b in the area of the partially closed outlet orifice 7, the cross-section of the passage openings is continuously variable.

Figure 18A:
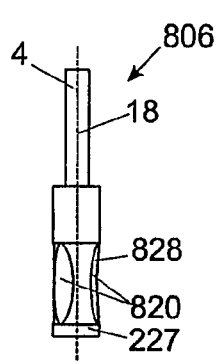
FIG. 18a shows a seventh embodiment of the delivery- and closure element as seen from the side with the view directed at the delivery surface.
Figure 18B:
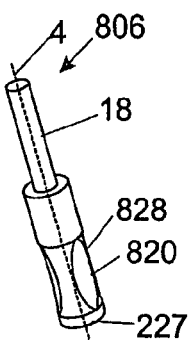
FIG. 18b shows the seventh embodiment of the delivery- and closure element in a three-dimensional representation.
Figure 18C:
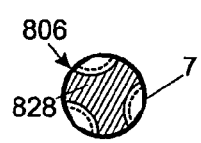
FIG. 18c shows the seventh embodiment of the delivery- and closure element in a sectional view in a plane that extends orthogonal to the central lengthwise axis in the area of the outlet orifice.

FIG. 18 represents a seventh embodiment of the delivery- and closure element 806 in different views, with FIG. 18a showing the delivery- and closure element 806 from the side with a view at the delivery surface, FIG. 18b showing the same in a three-dimensional representation, and FIG. 18c representing a sectional view in a plane oriented orthogonal to the central lengthwise axis in the area of the outlet orifice 7. Three oblong indentations 820 with mirror-symmetric borders in the shape of circular segments are arranged around the delivery portion 828 with their respective planes of symmetry oriented parallel to the central lengthwise axis FIG. 18c illustrates with particular clarity that as a result there are three areas of the outlet orifice 7 available for the dispensing of the substance when the delivery- and closure element 806 is in its open position, and that the three areas form passage openings whose size is continuously variable by a translatory displacement of the delivery- and closure element 806.

Depending on how far the delivery- and closure element is moved into the outlet orifice, one obtains a passage opening of variable size due to the variable width and depth of the recess that gets smaller in the direction towards the closure portion.

Variants of the housing of the dosage-dispensing head as well as different embodiments of the drive mechanism are conceivable. In principle, the conveying tool can also have its own drive mechanism, and its translatory as well as rotational mobility can be independent of the delivery- and closure element, with the conveying tool being in loose contact with the rim of the orifice opening at least when material is being dispensed.

The rod with the delivery- and closure element in a further embodiment can be tension-biased in the translatory direction so that when the drive mechanism is uncoupled, the outlet orifice is automatically closed.

List of Reference Symbols

| List of Reference Symbols | |
|---|---|
| 1, 101, 201, 301, 401, 601 | dosage-dispensing head |
| 2 | supply container |
| 3, 203, 303, 603 | housing |
| 4 | central lengthwise axis |
| 5 | internal screw thread |
| 6, 106, 206, 306, 406, 606, 706, 806 | delivery - and closure element |
| 7, 607 | outlet orifice |
| 8 | external screw thread |
| 9, 609 | rod |
| 10, 110, 210, 710 | delivery surface |
| 11 | apex of angle |
| 12, 212, 412, 612 | conveying tool |
| 14 | stirrer part |
| 15, 215, 315, 415, 615 | conveying element |
| 16 | transverse bolt |
| 17 | tip of conveying element |
| 18 | bolt |
| 19 | coupling area |
| 120, 220, 820 | recess |
| 121 | surface forming the bottom edge of the delivery - and closure element 106 |
| 22 | indentation |
| 23 | projecting ledge |
| 24 | groove of variable depth and width |
| 25 | helix spring |
| 26 | arm of wire or plastic |
| 27, 127, 227, 627, 727 | closure portion |
| 28, 128, 228, 328, 428, 528, 628, 728, 828 | delivery portion |
| 29 | upper ring-shaped holder |
| 30 | lower ring-shaped holder |
| 31 | take-along section |
| 32 | groove |
| 33, 433 | holder ring |
| 34 | projection |
| 35, 235, 435 | projecting arm |
| 36 | circular groove |
| 37 | tip |
| 38 | stirrer element |
| 39 | wing |
| 40 | eyelet |
| 41 | eyelet |
| 42 | eyelet |
| 43 | wheel |
| 44 | curved tip |
| 46 | triangular groove or notch |

The invention claimed is:

1. Dosage-dispensing device for substances in powder or paste form comprising:
   a supply container and;
   a dosage-dispensing head connectable to the supply container, said dosage-dispensing head including:
      a housing;
      an outlet orifice of circular cross-section;
      a delivery and closure element with a closure portion serving to close off the outlet orifice; and
      a conveying tool with at least one conveying element that serves to direct the substance to the outlet orifice, wherein the outlet orifice and the delivery and closure element are arranged on a central lengthwise axis of the dosage-dispensing head, and wherein the conveying tool is rotatable about the central lengthwise axis in relation to the housing and the at least one conveying element is in contact with the outlet orifice and configured to move on a circular path about the central lengthwise axis, wherein the delivery and closure element comprises a delivery portion which serves to deliver substance that is to be dispensed, wherein the delivery and closure element is configured to be rotatable about the central lengthwise axis in relation to the housing and to be translated along the central lengthwise axis relative to the outlet orifice, and wherein the at least one conveying element is slanted in a direction of its rotation at an acute angle to the plane of its circular path.

2. Dosage-dispensing device according to claim 1, wherein the conveying tool is constrained in the dosage-dispensing head in such a way that the delivery and closure element and the conveying tool are configured to translate relative to each other along the central lengthwise axis.

3. Dosage-dispensing device according to claim 1, wherein the at least one conveying element of the conveying tool has a smooth surface portion.

4. Dosage-dispensing device according to claim 3, wherein the smooth surface portion has a curvature in at least one direction.

5. Dosage-dispensing device according to claim 3, wherein the smooth surface portion of the conveying element is slanted at an acute angle relative to the central lengthwise axis.

6. Dosage-dispensing device according to claim 3, wherein the smooth surface portion of the at least one conveying element is oriented at an acute angle to the radius of the circular path of the conveying element and tangentially touches a rim of the outlet orifice.

7. Dosage-dispensing device according to claim 6, wherein the conveying tool is configured to be in loose contact with the rim of the outlet orifice.

8. Dosage-dispensing device according to claim 6, wherein the at least one conveying element of the conveying tool comprises:
   a tip which is configured to be in loose contact with the rim of the outlet orifice.

9. Dosage-dispensing device according to claim 3, wherein the at least one conveying element has a sharp edge at a border of the conveying element that faces toward the outlet orifice.

10. Dosage-dispensing device according to claim 1, wherein the conveying tool is held in an elastically resilient manner.

11. Dosage-dispensing device according to claim 1, wherein the delivery- and closure element has a generally cylindrical form and has a cylindrical closure portion that serves to close off the outlet orifice and, adjacent to the closure portion, the delivery portion serves to deliver the substance to be dispensed, wherein when the dosage-dispensing device is in its operating state, the delivery portion is located in the lower part of the delivery- and closure element, said lower part having an end surface that is inclined at an oblique angle relative to a plane that extends orthogonal to the central lengthwise axis, wherein said end surface at its lowest point forms a tip that coincides with a point of the cylinder wall surface, and the topmost point likewise coincides with a point of the cylinder wall surface.

12. Dosage-dispensing device according to claim 1, wherein the delivery- and closure element has a generally cylindrical form and has a cylindrical closure portion that serves to close off the outlet orifice and further has, adjacent to the closure portion, a delivery portion that serves to deliver the substance to be dispensed, wherein said delivery portion has at least one indentation that is recessed from the cylinder wall surface.

13. Dosage-dispensing device according to claim 12, wherein the at least one indentation is formed by a recess, a notch, and/or a groove.

14. Dosage-dispensing device according to claim 12, wherein the width and/or the depth of the at least one indentation of the delivery portion vary in such a way that the profile of the indention gets smaller in a direction towards the closure portion.

15. Dosage-dispensing device according to claim 1, wherein the delivery portion is configured with such a shape that when the delivery portion of the delivery- and closure element is positioned in the outlet orifice, at least one passage opening is left free which is located away from the center and is of a non-concentric configuration.

16. Dosage-dispensing device according to claim 1, wherein the delivery- and closure element is connected to a rod that is arranged along the central lengthwise axis and traverses the supply container as a drive shaft.

17. Dosage-dispensing device according to claim 16, wherein the conveying tool is constrained to and/or guided by the rod for translatory movement of the conveying tool relative to the rod along the central lengthwise axis.

18. Dosage-dispensing device according to claim 17, wherein the conveying tool has a holder device with ring-shaped holders embracing the rod in two positions above each other, whereby the conveying tool is loosely connected to the rod.

19. Dosage-dispensing device according to claim 18, wherein the rod has a groove extending at least over part of the length of the rod, wherein the conveying tool has a holder ring arranged to loosely surround the part of the rod that carries the groove and to engage the groove with two projections.

20. Dosage-dispensing device according to claim 1, wherein the delivery- and closure element and the conveying tool are configured to move independently of each other.

21. Dosage-dispensing device according to claim 1, wherein the housing is shaped with a narrowing taper in a direction towards the outlet orifice.

* * * * *